US010885774B2

(12) United States Patent
Namba

(10) Patent No.: US 10,885,774 B2
(45) Date of Patent: Jan. 5, 2021

(54) TRAVEL CONTROL SYSTEM FOR VEHICLE

(71) Applicant: SUBARU CORPORATION, Tokyo (JP)

(72) Inventor: Ryosuke Namba, Tokyo (JP)

(73) Assignee: SUBARU CORPORATION, Tokyo (JP)

(\*) Notice: Subject to any disclaimer, the term of this patent is extended or adjusted under 35 U.S.C. 154(b) by 27 days.

(21) Appl. No.: 16/439,380

(22) Filed: Jun. 12, 2019

(65) Prior Publication Data

US 2020/0074848 A1 Mar. 5, 2020

(30) Foreign Application Priority Data

Sep. 4, 2018 (JP) .................................. 2018-165364

(51) Int. Cl.
*G08G 1/01* (2006.01)
*B60W 40/04* (2006.01)

(52) U.S. Cl.
CPC ............. *G08G 1/012* (2013.01); *B60W 40/04* (2013.01); *G08G 1/0125* (2013.01); *G08G 1/0141* (2013.01); *B60W 2554/00* (2020.02)

(58) Field of Classification Search
CPC .... G08G 1/012; G08G 1/0125; G08G 1/0141; B60W 40/04; B60W 2554/00
See application file for complete search history.

(56) References Cited

U.S. PATENT DOCUMENTS

| 2005/0010360 A1* | 1/2005 | Nagase ............ G08G 1/096827 |
| | | 701/423 |
| 2013/0103294 A1* | 4/2013 | Koshizen ............. G08G 1/0133 |
| | | 701/118 |
| 2017/0061793 A1 | 3/2017 | Witte et al. |

FOREIGN PATENT DOCUMENTS

| JP | 2015-108955 A | 6/2015 |
| JP | 2017-511528 A | 4/2017 |

OTHER PUBLICATIONS

Japanese Notice of Reasons for Refusal issued in corresponding Japanese Patent Application No. 2018-165364, dated Jun. 30, 2020, with English translation.

\* cited by examiner

*Primary Examiner* — Brian A Zimmerman
*Assistant Examiner* — Kevin Lau
(74) *Attorney, Agent, or Firm* — McDermott Will & Emery LLP

(57) ABSTRACT

A travel control system for a vehicle is configured to control travel of a vehicle with respect to a congestion section using information about the congestion section acquired from an outside of the vehicle by communication. The system includes a congestion position estimation unit and a reliability determination unit. The congestion position estimation unit is configured to, when the information about the congestion section cannot be acquired within a prescribed time, estimate a position of the congestion section using a probability distribution model of the congestion section. The reliability determination unit is configured to determine a reliability of the position of the congestion section estimated by the congestion position estimation unit based on a change of the probability distribution model over time.

16 Claims, 3 Drawing Sheets

TRAVEL CONTROL SYSTEM FOR VEHICLE

CROSS-REFERENCE TO RELATED APPLICATIONS

The present application claims priority from Japanese Patent Application No. 2018-165364 filed on Sep. 4, 2018, the entire contents of which are hereby incorporated by reference.

BACKGROUND

The disclosure relates to a travel control system for a vehicle that acquires information about a congestion section and controls the travel of a host vehicle.

In the field of vehicles such as automobiles, travel control systems that reduce burdens on drivers and provide comfortable and safe travel have been developed. Apart of such travel control systems has been put into practical use. Of the travel control system, a system not only acquires travel environment information detected by an in-vehicle device but also acquires traffic information from outside via communication and performs travel control in accordance with a situation of a traffic congestion occurring in a travel direction.

For instance, Japanese Unexamined Patent Application Publication No. 2015-108955 discloses a technique that, when road traffic information is congestion information and indicates a predetermined speed or less, determines that a road is in congestion and controls any one control target among an accelerator, a brake, and a hazard lamp.

SUMMARY

An aspect of the disclosure provides a travel control system for a vehicle configured to control travel of the vehicle with respect to a congestion section using information about the congestion section acquired from an outside of the vehicle by communication. The system includes a congestion position estimation unit and a reliability determination unit. The congestion position estimation unit is configured to, when the information about the congestion section cannot be acquired within a prescribed time, estimate a position of the congestion section using a probability distribution model of the congestion section. The reliability determination unit is configured to determine a reliability of the position of the congestion section estimated by the congestion position estimation unit on a basis of a change of the probability distribution model over time.

An aspect of the disclosure provides a travel control system for a vehicle configured to control travel of the vehicle with respect to a congestion section using information about the congestion section acquired from an outside of the vehicle by communication. The system includes circuitry. The circuitry is configured to, when the information about the congestion section cannot be acquired within a prescribed time, estimate a position of the congestion section using a probability distribution model of the congestion section. The circuitry is configured to determine a reliability of the estimated position of the congestion section on a basis of a change of the probability distribution model over time.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
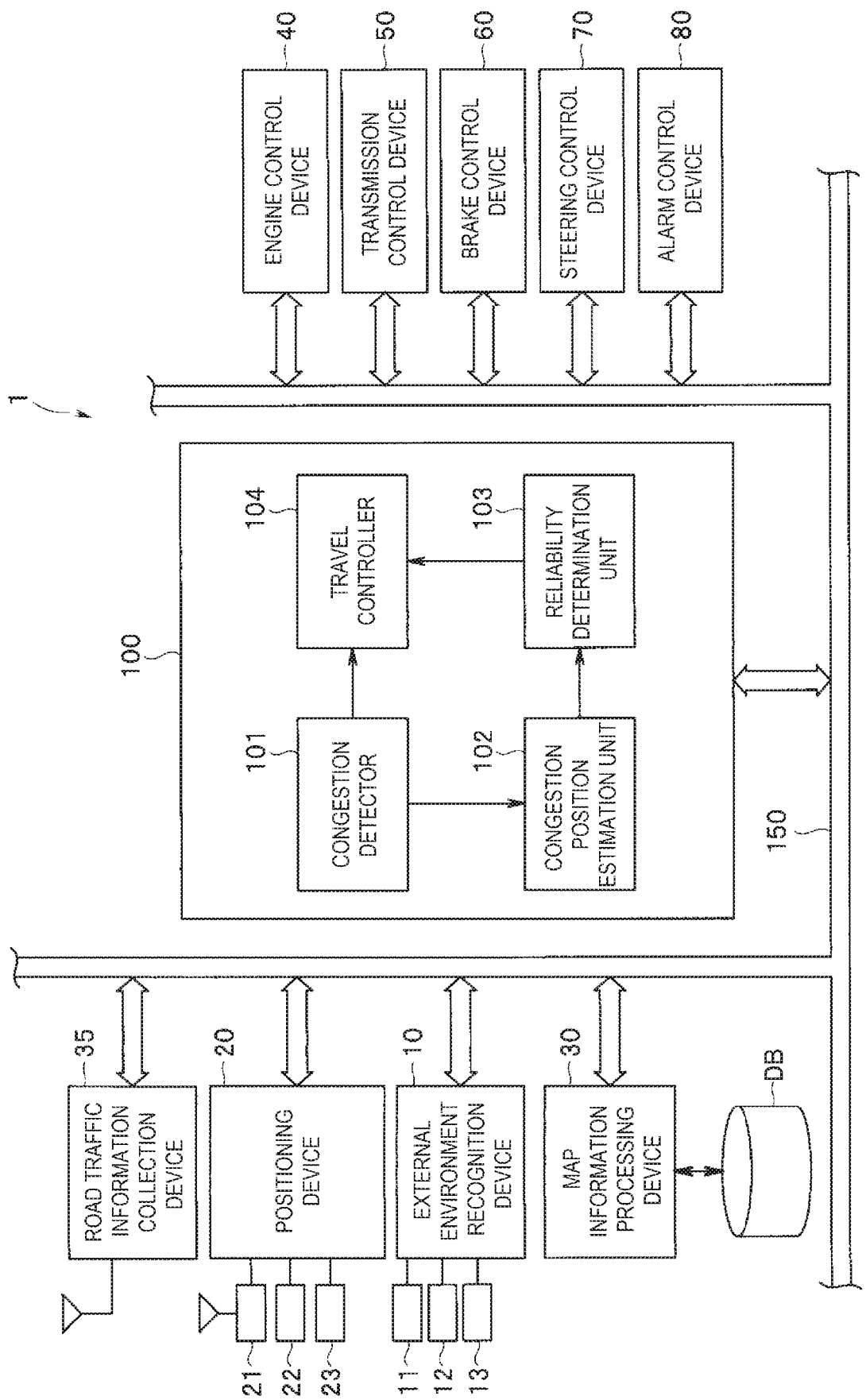
FIG. 1 is a configuration diagram illustrating a vehicle travel control system.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

When a vehicle travel control system receives congestion information from outside, there may be a time period in which the travel control system receives no congestion information due to a radio wave malfunction of a communication line or an antenna malfunction of an in-vehicle device. In such a case, if the travel control system determines that communication abnormality occurs and stops providing the congestion information to a driver or stops the travel control whenever making such a determination, the performance of driving assistance for the driver will be lowered, which leads to a decline in the marketability of the vehicle.

In this case, one skilled in the art may conceive of a method of storing the last received congestion information in a vehicle. However, the stored information deviates from actual congestion situation as time elapses, which might lead to presentation of incorrect information or improper vehicle control.

It is desirable to provide a travel control system for a vehicle capable of appropriately continuing travel control without immediately stopping the travel control even if congestion information cannot be normally received in controlling the travel of a host vehicle while receiving the congestion information.

In FIG. 1, reference numeral 1 denotes a vehicle travel control system. Instances of the vehicle include an automobile. The travel control system executes travel control including autonomous and automatic driving of the vehicle. The travel control system 1 includes a travel control device 100. The travel control device 100 may serve as a core part. The travel control system 1 also includes an external environment recognition device 10, a positioning device 20, a map information processing device 30, a road traffic information collection device 35, an engine control device 40, a transmission control device 50, a brake control device 60, a steering control device 70, and an alarm control device 80. Each device is connected to a network via a communication bus 150.

The external environment recognition device 10 includes various devices for environment recognition and various sensors. The various devices for environment recognition include an in-vehicle camera unit 11 and a radar device 12 such as a millimeter-wave radar or a laser radar. The various sensors include an external temperature sensor 13 that detects an external temperature as one of weather conditions of the external environment in which the host vehicle travels. The external environment recognition device 10 recognizes the external environment around the host vehicle based on (i) traffic information, (ii) detection information about an object around the host vehicle detected by the camera unit 11, the radar device 12, and the like, and (iii) environment information such as the external temperature detected by the external temperature sensor 13. Instances of the traffic information include position information of the host vehicle measured by the positioning device 20, map information provided from the map information processing device 30, and congestion information collected by the road traffic information collection device 35.

For instance, in a case where a stereo camera having two cameras that capture the same object from different viewpoints is mounted as the camera unit 11, the external environment recognition device 10 three-dimensionally recognizes the external environment by performing stereo processing on a pair of left and right images captured by the stereo camera. The camera unit 11 as the stereo camera has, for instance, two color cameras in a vicinity of an inner rear-view mirror on the top of the vehicle cabin and on the inner side of the front window. The color cameras each has an imaging device such as a CCD or a CMOS and are in shutter synchronization with each other. The color cameras are arranged on the left and right sides in the vehicle width direction so that the stereo camera has a predetermined base line length.

The external environment recognition device 10 performs matching processing for the pair of left and right images captured by the camera unit 11 as the stereo camera, to obtain a pixel deviation amount (parallax) between corresponding positions in the right and left images. The external environment recognition device 10 obtains a distance image by converting the pixel deviation amount into brightness data or the like. The external environment recognition device 10 transforms coordinates of points on the distance image into coordinates of points on a real space having the host vehicle at the center, based on the principle of triangulation. In this manner, the external environment recognition device 10 three-dimensionally recognizes lane lines (lanes) of a road on which the host vehicle travels, obstacles, vehicles traveling ahead of the host vehicle, and the like.

The external environment recognition device 10 recognizes a lane line of a road (which is lanes) by extracting a point group from an image as candidate points of the lane line and calculating a straight line or a curve connecting the candidate points. For instance, the external environment recognition device 10 detects edges which change in brightness by a predetermined amount or more on a plurality of search lines set in a horizontal direction (vehicle width direction) in a lane line detection region set on an image, to detect a set of a lane line start point and a lane line end point for each search line. The external environment recognition device 10 extracts an intermediate region between the lane line start point and the lane line end point as lane line candidate points.

Then, the external environment recognition device 10 processes time series data of spatial coordinate positions of the lane line candidate points based on a vehicle movement amount per unit time to calculate a model that approximates the left and right lane lines, and recognizes the lane lines using the model. Instances of the approximate model of the lane line include an approximate model obtained by connecting straight line components obtained by the Hough transform and a model approximated by a curve such as a quadratic equation.

The positioning device 20 mainly detects the vehicle position of the host vehicle based on signals from a plurality of navigation satellites such as global navigation satellite system (GNSS) satellites. When the positioning accuracy is deteriorated due to unstable receiving of signals (radio waves) from the satellites and the influence of multipath caused by reflection of radio waves, the positioning device 20 detects the vehicle position of the host vehicle using the above technique in combination with positioning through autonomous navigation using in-vehicle sensors such as a gyroscope sensor 22 and a vehicle speed sensor 23.

In positioning using the plurality of navigation satellites, the positioning device 20 receives signals including information about tracks and times transmitted from the navigation satellites via a receiver 21 and positions the self position of the host vehicle as an absolute position including longitude, latitude, altitude, and time information based on the received signals. In positioning using the autonomous navigation, the positioning device 20 positions the position of the host vehicle as a change amount in relative position, based on a travel direction of the host vehicle detected by the gyroscope sensor 22 and a travel distance of the host vehicle calculated from a vehicle speed pulse and the like output from the vehicle speed sensor 23.

The map information processing device 30 includes a map database DB. The map information processing device 30 identifies a position on map data of the map database DB based on the position data of the host vehicle positioned by the positioning device 20, and outputs the identified position. The map database DB is a database that stores a high-precision map created for vehicle control such as driving assistance control including automatic driving. The map database DB is stored in a mass storage medium such as a hard disk drive (HDD) or a solid state drive (SSD).

Specifically, the high-precision map is a multidimensional map (that is, a dynamic map) that has (i) static information such as road shapes and connection relationships between roads and (ii) dynamic information such as traffic information collected by infrastructure communication, in a plurality of layers. The road data includes the type of lane lines, the number of traveling lanes, the width of each traveling lane, point sequence data indicating a center position in the width direction of each traveling lane, the curvature of each traveling lane, and speed limit. The road data is stored together with attribute data such as data reliability and data update date.

Further, the map information processing device 30 maintains and manages the map database DB and always keeps nodes, links, and data points of the map database DB be in the latest state. The map information processing device 30 creates and adds new data to regions for which no data exists on the database to construct a more detailed database. The map information processing device 30 updates data in the map database DB and adds new data to the map database DB, by collating the position data positioned by the positioning device 20 and the data stored in the map database DB.

The road traffic information collection device 35 receives radio waves, for instance, from an information distribution server in intelligent transport systems (ITS) to collect road traffic information. For instance, the road traffic information collection device 35 acquires the road traffic information at predetermined time intervals (for instance, every 30 minutes) and sent the road traffic information to the travel control device 100. Instances of the road traffic information include presence or absence of road construction (location and time period), presence or absence of an accident (accident occurrence position and occurrence time), and road traffic (road congestion situation).

The engine control device 40 controls the operating state of an engine (not illustrated) based on signals from various sensors that detect the operating state of the engine and various control information transmitted via the communication bus 150. For instance, the engine control device 40 performs engine control based on an intake air amount, a throttle opening degree, an engine coolant temperature, an intake air temperature, an air-fuel ratio, a crank angle, an accelerator opening degree, and other vehicle information. The engine control mainly includes fuel injection control, ignition timing control, opening degree control of an electronic control throttle valve.

The transmission control device 50 controls hydraulic pressure to be supplied to an automatic transmission (not illustrated) based on (i) signals from sensors that detect a shift position and a vehicle speed and (ii) the various control information transmitted via the communication bus 150, and controls the automatic transmission in accordance with a preset transmission characteristic.

The brake control device 60 controls brake devices (not illustrated) of four wheels independently of a driver's brake operation based on, for instance, brake switch, wheel speeds of the four wheels, a steering angle, a yaw rate, and other vehicle information. Further, the brake control device 60 calculates the brake hydraulic pressure for each wheel based on the braking force of each wheel and performs operations of an antilock brake system, sideslip prevention control, and the like.

The steering control device 70 controls a steering torque by an electric power steering motor (not illustrated) of a steering system based on, for instance, the vehicle speed, a steering torque of the driver, the steering angle, the yaw rate, and the other vehicle information. The steering control device 70 controls the steering torque by current control of the electric power steering motor that outputs a target steering torque for making an actual steering angle equal to a target steering angle. When there is no override caused by the driver's steering operation, the drive current of the electric power steering motor is controlled by, for instance, PID control.

The alarm control device 80 is a device that controls an alarm that calls the driver's attention and controls output of various information to be presented to the driver when an abnormality occurs in various devices of the vehicle. For instance, the alarm control device 80 performs warning and information presentation using at least one of (i) visual output from a monitor, a display, and an alarm lamp or (ii) audible output from a speaker and a buzzer. The alarm control device 80 presents the control state to the driver during the execution of the driving assistance control including the automatic driving, and notifies the driver of the driving state when the driving assistance control including the automatic driving is stopped by the driver's operation.

Next, the travel control device 100 of the travel control system 1 will be described. When the operation mode is changed from a manual driving mode where the driver holds and steers a steering wheel to a travel mode for driving assistance by operating a switch or a panel (not illustrated), the travel control device 100 executes travel control in a driving assistance mode including automatic driving via the engine control device 40, the transmission control device 50, the brake control device 60, and the steering control device 70. In the travel control in the driving assistance mode, the travel control device 100 controls the host vehicle to travel at a predetermined speed and along a target path based on the external environment information recognized by the external environment recognition device 10, the position information of the host vehicle positioned by the positioning device 20, and the high-precision map information in the map database DB of the map information processing device 30.

When detecting, based on the road traffic information from the road traffic information collection device 35, congestion that occurs on the road ahead but cannot be recognized by the external environment recognition device 10 because the congestion is out of the observation field of the camera, the travel control device 100 decelerates the host vehicle traveling toward an end position of a congestion section (tail end of the congestion). At this time, even when the congestion information acquired as the external information from the outside of the host vehicle is lost, the travel control device 100 continues the travel control as much as possible without interruption.

That is, although the road traffic information collection device 35 is set to acquire the congestion information at regular time intervals from the server outside the host vehicle, there may be a time period in which the road traffic information collection device 35 receives no congestion information from the server due to causes such as a radio wave malfunction of a network line or a malfunction of an in-vehicle antenna. When the congestion information acquired by the road traffic information collection device 35 at regular time intervals is interrupted, the travel control device 100 estimates the position of the congestion section at least based on the last acquired congestion information and the elapsed time after the interruption of the information. Then, the travel control device 100 performs the travel control when the reliability of the estimated position of the congestion section exceeds a predetermined threshold.

Therefore, the travel control device 100 includes a congestion detector 101, a congestion position estimation unit 102, a reliability determination unit 103, and a travel controller 104 which are functional units of the travel control with respect to a congestion. These functional units enables the travel control device 100 to properly estimate a position of a congestion section and continue the driving assistance mode without interruption even when the periodically acquired congestion information is interrupted.

Specifically, the congestion detector 101 acquires the road traffic information from the road traffic information collection device 35, acquires the congestion information from the road traffic information, and checks whether congestion occurs in the road ahead. The congestion information includes information such as a head position of the congestion section (congestion head position), a tail end position of the congestion section (congestion tail end position), a travel speed of the tail end of the congestion section (congestion tail end speed), and a length of the congestion section. The congestion detector 101 at least acquires the congestion tail end position and the congestion tail end speed.

In this case, the congestion detector 101 monitors whether (i) the road traffic information collection device 35 receives radio waves from the external server and (ii) the congestion detector 101 acquires the congestion information within a prescribed time (for instance, 30 seconds). When the congestion detector 101 does not acquire the congestion information from the road traffic information collection device 35 within the prescribed time, the congestion detector 101 instructs the congestion position estimation unit 102 to estimate the position of the congestion section.

The congestion position estimation unit 102 estimates the position of the congestion section using a probability distribution model in which the variation of congestion sections is probabilistically expressed. In the embodiment, the congestion position estimation unit 102 estimates the congestion tail end position x as the position of the congestion section, using a congestion distribution model f(x) expressed by a probability density function which has the congestion tail position x as a variable.

It is assumed that the congestion distribution model f(x) is a model in which the variation of the position of the congestion section (the congestion tail end position) follows the normal distribution as indicated in the following equation (1). A variance $\sigma^2$ in the congestion distribution model f(x) is calculated based on data received in the past.

$$f(x)=N(x,\sigma^2) \quad (1)$$

Alternatively, the congestion distribution model f(x) is, for instance, a model premised on the Poisson distribution in order to deal with congestion caused by an unexpected accident.

The congestion position estimation unit 102 estimates the congestion tail end position at time t after time t0 according to the following equation (2) based on the equation (1), where t0 is a time at which the congestion information is last acquired, x0 is the congestion tail end position at the time t0, and v0 is the congestion tail end speed at the time t0. In the equation (2), $\sigma_t^2$ represents a change of the variance $\sigma_0^2$ at the time t0 over time.

$$f(x)=N(x0+v0(t-t0),\sigma_0^2 \sigma_t^2) \quad (2)$$

Figure 2:
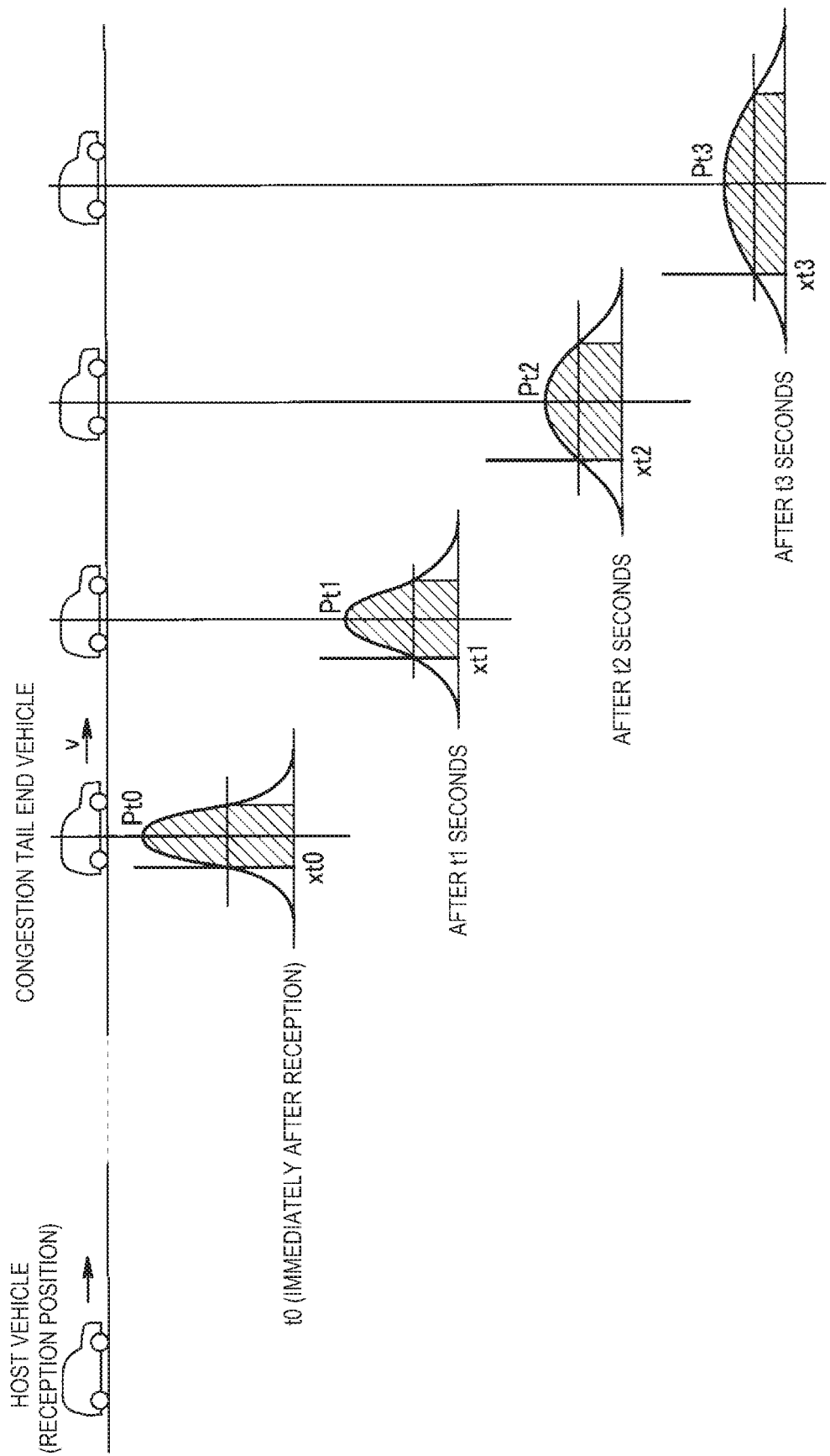
FIG. 2 is an explanatory diagram illustrating a time elapse after reception of congestion information and a change in reliability of the congestion information.

That is, when the congestion information cannot be acquired within the prescribed time, as illustrated in FIG. 2, (i) the probability at the center of the normal distribution of the congestion tail end position is presumed to gradually decrease over time, such as after t1 seconds, after t2 seconds, and after t3 seconds, from the t0 at which the congestion information is last acquired, which leads to a decrease in reliability of the estimation value of the congestion tail end position and (ii) the variance of the congestion distribution model f(x) is presumed to increase over time from the t0 while the vehicle at the congestion tail end is moving at speed v. Therefore, the congestion position estimation unit 102 sets an estimation value of the congestion tail end position to a tail end position xt corresponding to an end, on a host vehicle side, of a predetermined range represented by the standard deviation σ of the normal distribution (for instance, a range of ±3σ) in the congestion distribution model f(x) at time t after the time t0 immediately after the reception of the last congestion information, as illustrated in the following equation (3).

$$xt=x0+v0(t-t0)-3(\sigma_0^2+\sigma_t^2) \quad (3)$$

In this case, since the congestion tail end position also changes depending on a state of vehicles traveling in the vicinity (mainly ahead) of the host vehicle, the congestion position estimation unit 102 may correct the estimation value of the congestion tail end position based on the number of nearby vehicles and the moving speed of the congestion tail end after the congestion information is last acquired. That is, preceding vehicles ahead of the host vehicle and other vehicles overtaking the host vehicle are factors causing the change of the congestion tail end position. Therefore, the congestion position estimation unit 102 may correct the estimation value of the congestion tail end position, which is estimated from the congestion distribution model f(x), based on (i) a distance increase amount due to the number of those vehicles and (ii) a distance change amount due to the moving speed of the congestion tail end.

The reliability determination unit 103 compares a probability Pt at the center of the normal distribution for the estimation value xt of the congestion tail end position, which is estimated by the congestion position estimation unit 102, with a preset threshold H to determine the reliability of the estimation value xt of the congestion tail end position. The threshold H is, for instance, about 60% to 70% of a probability Pt0 at the center at the time t0 at which the congestion tail end information is last acquired.

As illustrated in FIG. 2, when the congestion position estimation unit 102 calculates, for the congestion tail end position xt0 at the time to at which the congestion tail end is last acquired, an estimation value of the congestion tail end position xt1=x0+v0 (t-t0)-3 $(\sigma_0^2+\sigma_t^2)$ based on a congestion distribution model f(x0+v0 (t1-t0)) at t1 seconds after the time t0, the reliability determination unit 103 compares a probability Pt1 at the center of the congestion distribution model f(x0+v0 (t1-t0)) at t1 seconds after the time t0 with the threshold H. When the probability Pt1 is larger than the threshold H, the reliability determination unit 103 determines (i) that the reliability of the estimation value xt1 of the congestion end position is high enough to perform the travel control and (ii) that the estimation value xt1 of the traffic congestion tail end position is applicable to the travel control.

Similarly, when a probability Pt2 at the center of a congestion distribution model f (x0+v0 (t2-t0)) at t2 seconds from the time t0 is larger than the threshold H, the reliability determination unit 103 determines that the reliability of an estimation value xt2 of the congestion tail end position at t2 seconds after the time t0 is high enough to perform the travel control. On the other hand, when a probability Pt3 at the center of a congestion distribution model f(x0+v0 (t3-t0)) at t3 seconds after the time t0 decreases to be equal to or lower than the threshold H, the reliability determination unit 103 determines (i) that an estimation value xt3 of the congestion tail end position at t3 seconds after the time t0 contains a large error and (ii) that the reliability of the estimation value xt3 of the congestion tail end position is not high enough to perform the travel control. The reliability determination unit 103 notifies the travel controller 104 of the occurrence of an abnormality, and providing the congestion information to the driver is stopped.

When the congestion detector 101 detects that congestion has occurred in the road ahead, the travel controller 104 performs a travel control to decelerate the host vehicle using the congestion tail end position as a target position, based on the congestion information that the road traffic information collection device 35 receives from the external information distribution server. When the host vehicle approaches the congestion tail end, which enables the driver to recognize the congestion tail end, the travel controller 104 transitions to a deceleration control (which includes stopping a vehicle) based on the external environment information provided from the external environment recognition device 10.

In this case, when the road traffic information collection device 35 cannot receive the congestion information within the prescribed time due to a communication malfunction at a position outside a recognizable external environment of the external environment recognition device 10, the travel controller 104 continues or interrupts the travel control in accordance with the determination result of the reliability of the estimation value xt of the congestion tail end position estimated by the congestion position estimation unit 102.

That is, when the reliability determination unit 103 determines that the reliability of the estimation value xt of the traffic congestion end position is high enough to continue the travel control, the travel controller 104 continues the travel control without interrupting the travel control using the estimation value xt of the congestion tail end position. On the other hand, when the reliability determination unit 103 determines (i) that the reliability of the estimation value xt of the congestion tail end position is not high enough to perform the travel control and (ii) that the estimation value xt of the congestion tail end position is not applicable to the travel control, the travel controller 104 stops the travel control.

Next, the travel control process with respect to congestion will be described with reference to a flowchart of FIG. 3.

Figure 3:
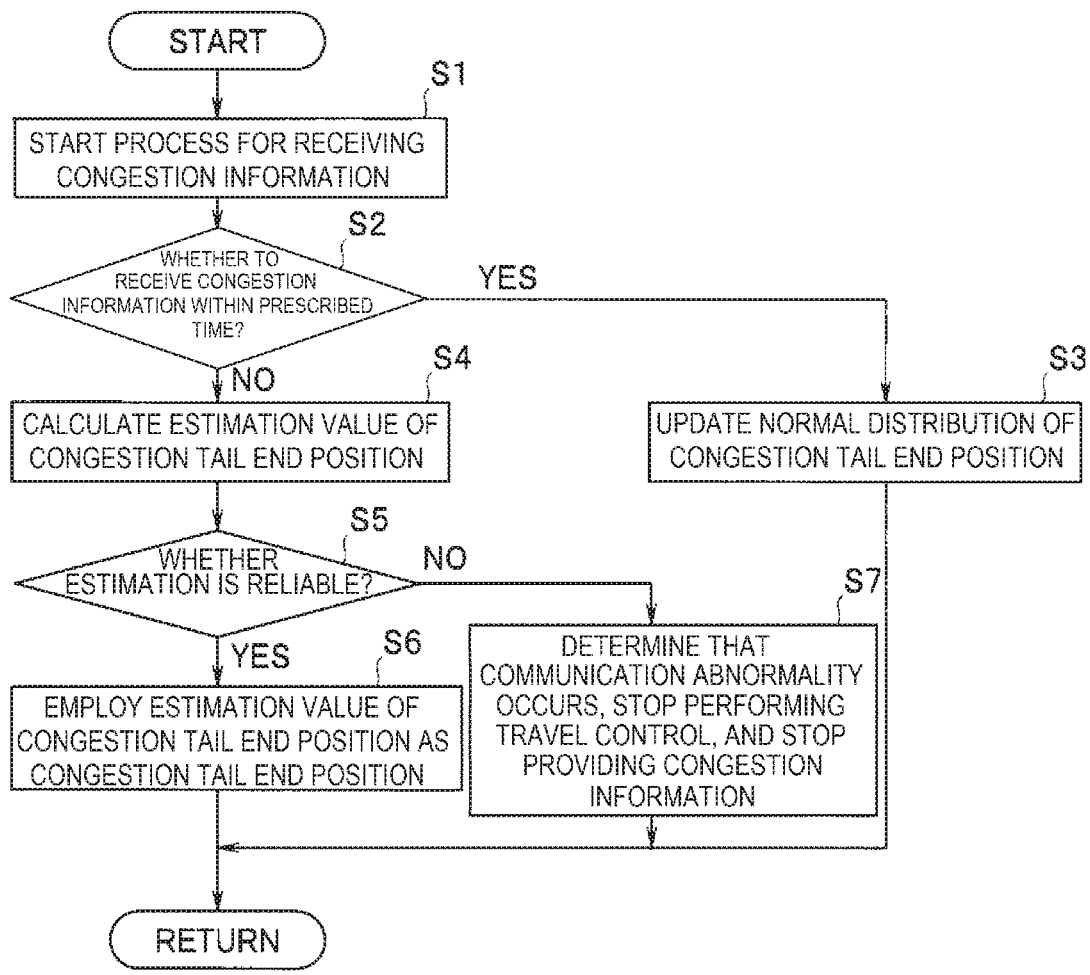
FIG. 3 is a flowchart illustrating a travel control process for congestion.

The travel control process illustrated in FIG. 3 is a process performed at regular time intervals in the travel control device 100. First, in a first step S1, the travel control device 100 starts acquiring the congestion information received via the road traffic information collection device 35. Next, the process proceeds to step S2 to check whether the road traffic information collection device 35 completes receiving the congestion information and the congestion detector 101 successfully acquires the congestion information within the prescribed time (for instance, 30 seconds).

When the road traffic information collection device 35 receives the congestion information and the congestion detector 101 successfully acquires the congestion information within the prescribed time, the process proceeds from step S2 to step S3 and updates the congestion distribution model f(x) which is premised on that the congestion tail end position x follows the normal distribution. Then, the process is terminated. On the other hand, when the road traffic information collection device 35 does not complete receiving the congestion information within the prescribed time, the process proceeds from step S2 to step S4 and the congestion position estimation unit 102 calculates the estimation value xt of the congestion tail end position at time t. As described above with reference to the equation (3), the congestion position estimation unit 102 calculates the congestion end position xt as the position corresponding to the end, on the host vehicle side, of the range of ±3σ in the congestion distribution model f(x) at the time t after the congestion information is last received.

Then, the process proceeds to step S5 and the reliability determination unit 103 compares the probability Pt at the center of the normal distribution of the congestion tail end position at time t with the preset threshold H and determines whether the estimation is reliable. As a result of the above determination, when Pt is larger than H which means the estimation is reliable, the process proceeds to step S6 and employs the estimation value xt of the congestion tail end position as the congestion tail end position for the travel control and information provision to the driver. On the other hand, when Pt is equal to or less than H which means the estimation is not reliable, the process determines that a communication abnormality occurs. Then, the process proceeds to step S7, the travel controller 104 stops the travel control, and the process stops the providing the congestion information to the driver.

In the embodiment as described above, when a time period occurs in which the congestion information cannot be received due to a communication malfunction during execution of the travel control to receive the congestion information from outside of the host vehicle and to decelerate the host vehicle which travels towards the congestion tail end, the congestion tail end position is estimated using the probability distribution model of the congestion information. As a result, even when the congestion information cannot be received, the travel control is continued without being stopped immediately, the frequency of the provision of information to the driver and the frequency of the abnormal stop of the travel control function are reduced, and the marketability of the vehicle is greatly improved.

The travel control device 100 including the congestion detector 101, the congestion position estimation unit 102, the reliability determination unit 103, and the travel controller 104 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the travel control device 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the travel control device 100.

The invention claimed is:

1. A travel control system for a vehicle configured to control travel of the vehicle with respect to a congestion section using information about the congestion section acquired from outside of the vehicle, the system comprising: a congestion position estimation unit configured to, when the information about the congestion section cannot be acquired within a prescribed time, estimate a position of the congestion section using a probability distribution model of the congestion section; and a reliability determination unit configured to determine a reliability of the position of the congestion section estimated by the congestion position estimation unit on a basis of a change of the probability distribution model over time.

2. The travel control system for a vehicle according to claim 1, wherein the information about the congestion section includes at least a position of a tail end of the congestion section and a travel speed at the tail end of the congestion section.

3. The travel control system for a vehicle according to claim 2, wherein the congestion position estimation unit is configured to estimate the position of the tail end of the congestion section on a basis of the travel speed at the tail end of the congestion section and an elapsed time since the information about the congestion section is last acquired.

4. The travel control system for a vehicle according to claim 1, wherein the congestion position estimation unit is configured to estimate a position of a tail end of the congestion section premised on that the probability distribution model is a model in which the position of the congestion section follows a normal distribution.

5. The travel control system for a vehicle according to claim 2, wherein the congestion position estimation unit is configured to estimate the position of the tail end of the congestion section premised on that the probability distribution model is a model in which the position of the congestion section follows a normal distribution.

6. The travel control system for a vehicle according to claim 3, wherein the congestion position estimation unit is configured to estimate the position of the tail end of the congestion section premised on that the probability distribution model is a model in which the position of the congestion section follows a normal distribution.

7. The travel control system for a vehicle according to claim 4, wherein the congestion position estimation unit is configured to estimate the position of the tail end of the congestion section to be an end, on a vehicle side, of a predetermined range of the normal distribution.

8. The travel control system for a vehicle according to claim 5, wherein the congestion position estimation unit is configured to estimate the position of the tail end of the congestion section to be an end, on a vehicle side, of a predetermined range of the normal distribution.

9. The travel control system for a vehicle according to claim 6, wherein the congestion position estimation unit is configured to estimate the position of the tail end of the congestion section to be an end, on a vehicle side, of a predetermined range of the normal distribution.

10. The travel control system for a vehicle according to claim 1, wherein the congestion position estimation unit is configured to correct an estimation value of a position of a tail end of the congestion section according to a state of another vehicle traveling around the vehicle.

11. The travel control system for a vehicle according to claim 2, wherein the congestion position estimation unit is configured to correct an estimation value of the position of the tail end of the congestion section according to a state of another vehicle traveling around the vehicle.

12. The travel control system for a vehicle according to claim 3, wherein the congestion position estimation unit is configured to correct an estimation value of the position of the tail end of the congestion section according to a state of another vehicle traveling around the vehicle.

13. The travel control system for a vehicle according to claim 1, wherein when a reliability of a estimation value of a position of a tail end of the congestion section decreases by a predetermined value or more, the reliability determination unit determines that the estimation value of the position of the tail end of the congestion section is not applicable to controlling the travel of the vehicle and stops the control of the travel of the vehicle.

14. The travel control system for a vehicle according to claim 2, wherein when a reliability of a estimation value of the position of the tail end of the congestion section decreases by a predetermined value or more, the reliability determination unit determines that the estimation value of the position of the tail end of the congestion section is not applicable to controlling the travel of the vehicle and stops the control of the travel of the vehicle.

15. The travel control system for a vehicle according to claim 3, wherein when a reliability of a estimation value of the position of the tail end of the congestion section decreases by a predetermined value or more, the reliability determination unit determines that the estimation value of the position of the tail end of the congestion section is not applicable to controlling the travel of the vehicle and stops the control of the travel of the vehicle.

16. A travel control system for a vehicle configured to control travel of the vehicle with respect to a congestion section using information about the congestion section acquired from outside of the vehicle, the system comprising circuitry configured to estimate, when the information about the congestion section cannot be acquired within a prescribed time, a position of the congestion section using a probability distribution model of the congestion section; and determine a reliability of the estimated position of the congestion section on a basis of a change of the probability distribution model over time.

* * * * *